Aug. 6, 1957

L. O. REICHELT 2,801,603

ALIGNING FIXTURE FOR BRAZING PARTS

Filed March 30, 1954

INVENTOR
L.O. REICHELT
BY C.B. Hamilton
ATTORNEY

Aug. 6, 1957 — L. O. REICHELT — 2,801,603
ALIGNING FIXTURE FOR BRAZING PARTS
Filed March 30, 1954 — 2 Sheets-Sheet 2
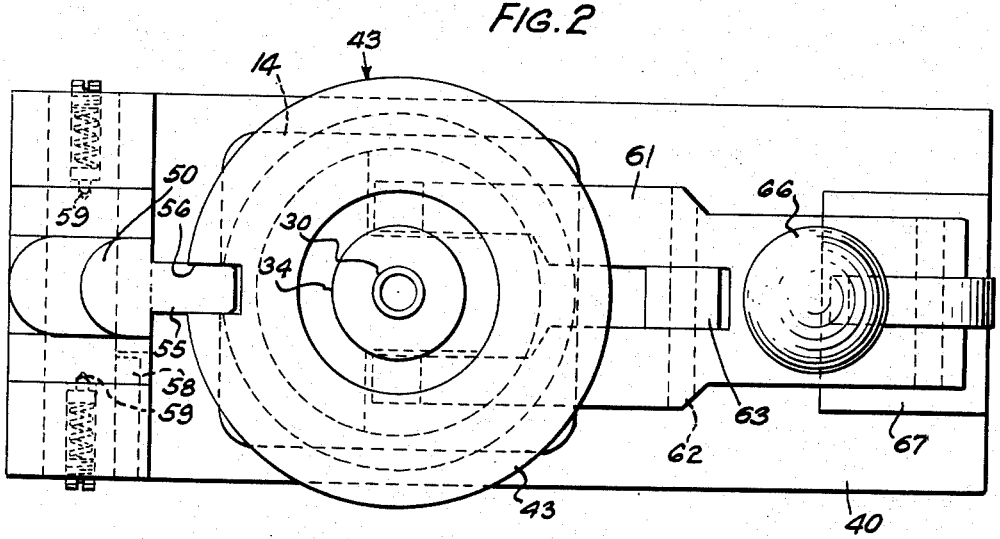
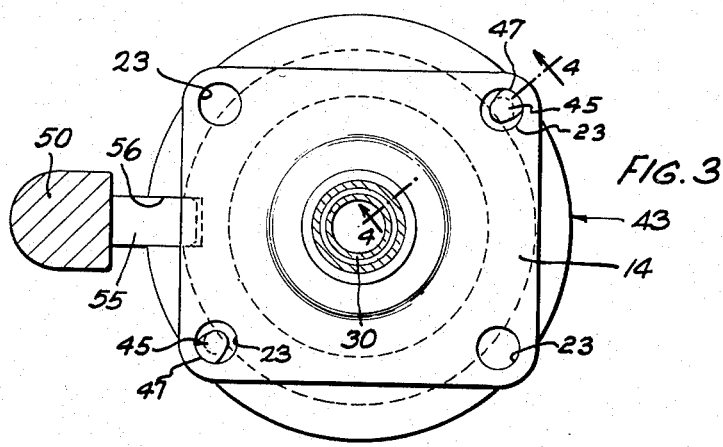
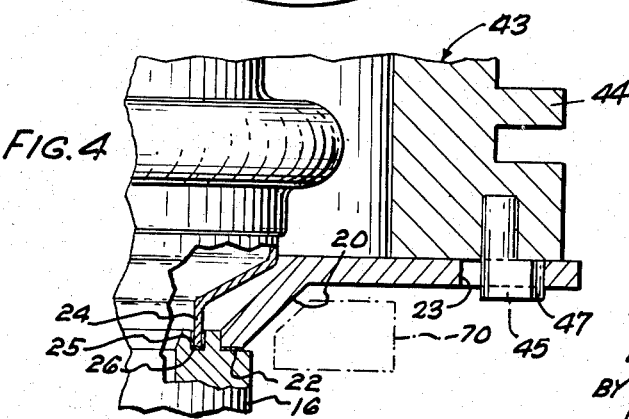
INVENTOR
L. O. REICHELT
BY
ATTORNEY

United States Patent Office

2,801,603
Patented Aug. 6, 1957

2,801,603

ALIGNING FIXTURE FOR BRAZING PARTS

Lester O. Reichelt, St. Paul, Minn., assignor to Western Electric Company, Incorporated, New York, N. Y., a corporation of New York Application March 30, 1954, Serial No. 419,891

5 Claims. (Cl. 113—99)

This invention relates to a device for aligning the components of an article and for supporting them while they are being brazed and more particularly to a fixture for aligning a mounting plate on and in a predetermined angular relation to the body of a magnetron and for supporting the parts in aligned and assembled relation while they are being brazed together.

An object of the present invention is to provide a device for aligning components of an article and for supporting them in aligned position while they are being brazed.

Another object of the invention is to provide a fixture for angularly aligning a body of a magnetron and a mounting plate therefor and for supporting them while they are being brazed together.

A device illustrating certain features of the invention for aligning components of a magnetron and supporting them in a brazing apparatus may include a base for removably supporting an arbor on which a magnetron body, a tubular component of the magnetron, and a mounting plate therefor are telescoped in assembled relation to each other. An annular cooling block which is adapted to encircle the mandrel and the tubular component of the magnetron is supported on the mounting plate and has a pair of gage pins which project into diametrically opposed holes in the plate for engaging restricted portions thereof to interlock the block and the plate against relative lateral or turning movement. An aligning arm pivotally mounted on the base has a first gaging element movable into an aperture in the body of the magnetron and a second gaging element engageable in a recess in the cooling block for positioning the cooling block and the mounting plate interconnected therewith in a predetermined angular relation relative to the body of the magnetron.

Other objects and advantages of the invention will become apparent by reference to the following detailed description and the accompanying drawings illustrating a preferred embodiment thereof, in which Fig. 1 is a vertical sectional elevational view of the fixture with the magnetron components assembled thereon;

Fig. 2 is a plan view of the device shown in Fig. 1;

Fig. 3 is a sectional view taken on the line 3—3 of Fig. 1; and

Fig. 4 is an enlarged fragmentary vertical sectional view taken along the line 4—4 of Fig. 3.

Figure 1:
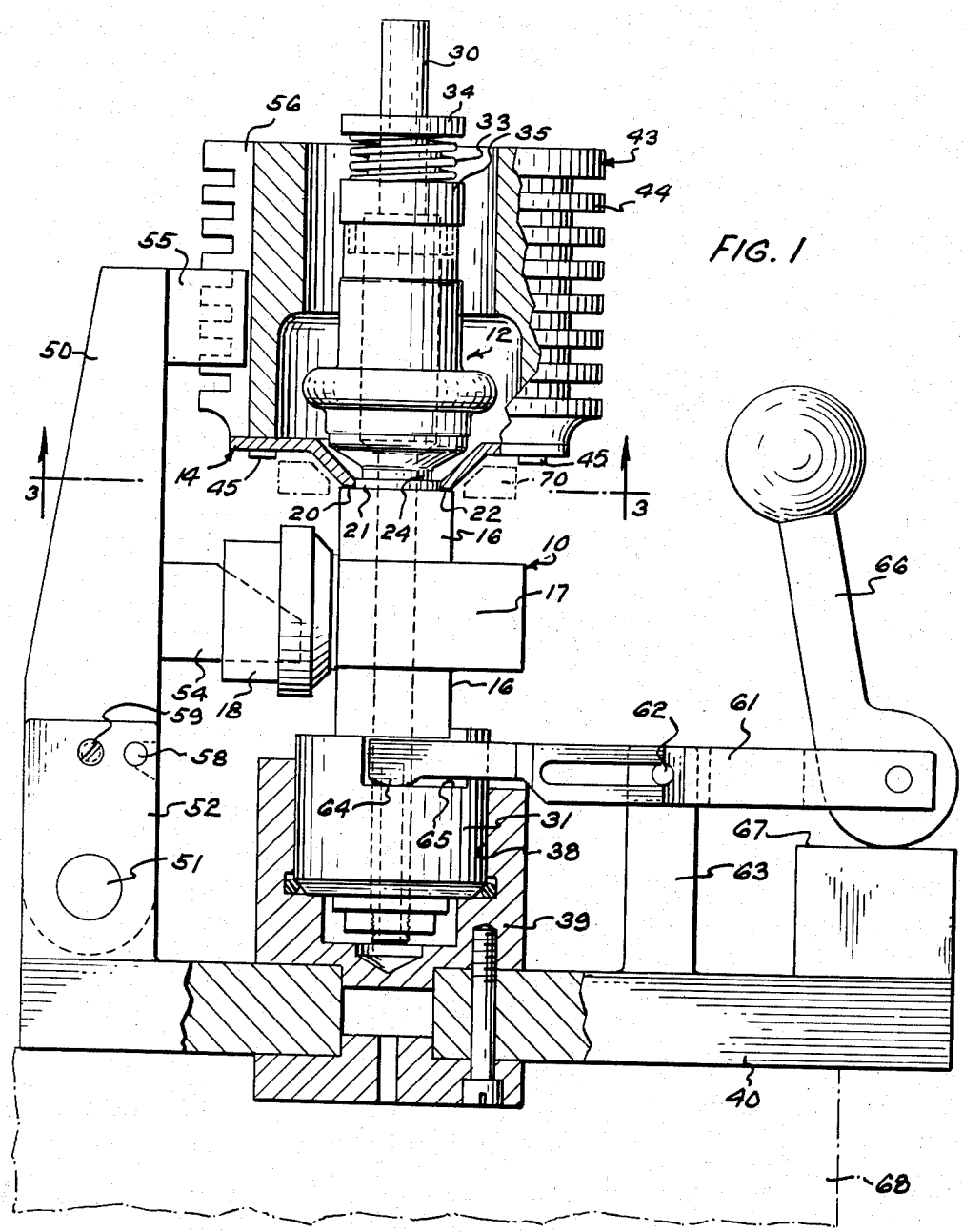

The present fixture is designed for use in aligning a body component 10 of a magnetron electronic tube, a tubular envelope component 12, and a mounting plate component 14 and for supporting the components in assembled and aligned position relative to one another while the mounting plate and envelope components are being brazed to the body component. An important purpose of the fixture is to angularly align the mounting plate in a predetermined position relative to the body of the magnetron. The body component of the magnetron has a pair of pole pieces 16 on opposite ends of a central portion 17, and a laterally disposed hollow output portion 18 provided with an aperture of a predetermined configuration. The mounting plate 14 is rectangular and has a central apertured conical portion, the angular inner edge portion 20 of which fits on an annular seat 21 formed on the upper pole piece 16 and is adapted to be brazed thereto by heating the components and a ring of brazing material 22 interposed between the pole piece 16 and the edge 20 of the mounting plate. In the corners of the plate 14 are holes 23 accurately positioned in predetermined relation to each other and the axis of the central aperture therein. The tubular component 12 has an annular metal end member 24, the lower edge of which fits in an annular groove 25 in the upper pole piece 16 and is adapted to be brazed therein by heating the components and a ring of brazing material 26 interposed between the edge 24 and the pole piece 16.

The components 10, 12, and 14 of the magnetron are adapted to be telescoped in assembled relation to each other over an arbor 30 as shown in Fig. 1 with the lower pole piece 16 of the body component 10 resting on the upper surface of a cylindrical head 31 of the arbor. The arbor 30 coaxially aligns the components 10 and 12, and the component 12 is pressed against the component 10 under a slight pressure by a spring 33 interposed between a collar 34, releasably secured to the arbor 30, and an annular aligning member 35 fitting within the end of the tubular component 12. The head 31 of the arbor 30 is adapted to fit in a cylindrical recess 38 in a holder 39 fixed to a base plate 40 of the fixture, and the arbor 30 and the magnetron components supported thereby may be oscillated about the axis of the arbor.

A cooling and aligning member 43 is applicable to the mounting plate for cooling the plate during the brazing operation and for aiding in aligning the mounting plate in predetermined angular relation to the body component 10 of the magnetron. The member 43, which is in the form of a hollow cylindrical block having cooling fins 44, encircles the envelope component 12 and has a flat lower surface adapted to engage the upper face of the mounting plate 14. A pair of hardened aligning pins 45 fixed to the underneath side of the member 43 fit into a diametrically opposed pair of the holes 23 of the mounting plate. The pins 45 have curved cylindrical surfaces 47 which conform to the cylindrical surfaces of the holes 23 and engage portions of the cylindrical surfaces disposed farthest from the axis of the central opening through the plate as shown in Fig. 3. The pins 45 are shaped so that the major portion thereof are disposed in spaced relation to the walls surrounding the holes 23 in the mounting plate to provide clearance for the expansion of the plate 14 during the brazing operation. The arcuate surfaces 47 of the pins 45 engage corresponding arcuate surfaces of the holes 23 through a width sufficient to accurately position and hold the mounting plate against turning or lateral movement relative to the cooling aligning member 43.

Means are provided for angularly aligning the body component 10 of the magnetron and the cooling and aligning member 43 to effect the proper angular alignment of the mounting plate 14 relative to the body component 10. The aligning means comprises an arm 50 pivotally mounted on a pin 51 which is supported in a pair of supports 52 fixed to the base plates 40. The arm 50 has a gaging element 54 adapted to be moved into the recess in the output portion 18 of the magnetron component 10 and engage the side walls thereof to angularly dispose the body component 10 in a predetermined position. A gaging element 55 mounted on the upper end of the arm 50 in vertical alignment with the gaging element 54 is movable into a slot or gaging recess 56 formed in the cooling and aligning member 43 and is engageable with the side walls thereof for positioning the aligning member 43 and the mounting plate 14 in a predetermined angular relation with respect to the body component 10 of the magnetron. A pin 58 fixed to one of the supports 52 serves to stop the arm 50 in its vertical operative position and a pair of spring detents 59 yieldably maintain the arm 50 in this position.

The arbor 30 with the magnetron components 10, 12, and 14 aligned thereon is clamped to the holder 39 of the fixture by a clamping bar 61 pivotally mounted at 62 on a post 63 fixed to the base 40. The bar 61 has a bifurcated end 64, which engages shoulders 65 on the head 31 of the arbor, and the bar 61 has a cam lever 66 pivotally connected at the other end thereof which is operable in cooperation with a block 67 on the base 40 for actuating the clamping bar 61 to and from released and clamping positions. The arbor 30 may be hollow to permit the circulation of a coolant therethrough and suitable seals and ports are provided for circulation of the coolant and for preventing leakage thereof from the arbor into the magnetron.

The fixture is adapted to be mounted on the end of a plunger 68 indicated in dotted lines in Fig. 1 for moving the fixture with the magnetron components assembled thereon into operative position in a brazing apparatus having a split induction heating coil 70, which coil may be moved into closed position about the work as indicated in dotted lines in Figs. 1 and 4.

It will thus be seen from the above description that the body component 10, the envelope component 12, and the mounting plate component 14 of the magnetron and the rings 22 and 26 of brazing material may be assembled on the arbor in coaxial alignment relative to each other, and the arbor with components thereon is applied to the fixture, after which the cooling and aligning member 43 is applied to the mounting plate with the aligning pins 45 engaging portions of a pair of the holes 23 in the mounting plate. The body component 10 of the magnetron and the mounting plate 14 may then be turned relative to each other to permit the aligning arm 50 to be raised to its vertical position and the gage elements 54 and 55 to enter the recesses in the output portion 18 of the body component 10 and the guide recess 56 in the cooling and aligning member 43, thereby effecting the precise angular alignment of the mounting plate 14 with respect to the body component 10 of the magnetron. With the components of the magnetron thus supported in properly aligned position relative to each other, the fixture may be moved to dispose the components in operative position in the brazing apparatus and the brazing together of the magnetron components effected.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for angularly aligning a recessed body component and an apertured mounting plate component of an article and for supporting said components while they are being brazed together comprising means for supporting the body component with the mounting plate superposed thereon for relative angular movement of the components about a substantially vertical axis, a gage member adapted to be supported on the mounting plate and having a pair of depending integral pins adapted to fit into a pair of diametrically opposed apertures in the mounting plate, said pins being substantially smaller than the apertures in said plate and having surfaces conforming to and engageable with a portion of said apertures to interlock the plate and the gage member against relative rotary or lateral movement and to provide clearance permitting expansion of the mounting plate during the brazing operation, said gage member having a laterally disposed recess, an aligning member having a first element thereon engageable in a laterally disposed recess in said body component and having a second element engageable in the recess in the gage member, and means for mounting said aligning member on said supporting means for movement to an operative position adjacent said components and with the elements of the aligning member in engagement with the recesses in said body component and said gage member to angularly align the mounting plate and the body component relative to each other.

2. A fixture for angularly aligning an apertured mounting plate component on a recessed body component of an article and for supporting the components while they are being bonded together comprising means for supporting said body component with said mounting plate supported thereon for relative angular movement of the components about a substantially vertical axis, a gage member adapted to be supported on the mounting plate component and having a pair of integral depending pins adapted to fit into a pair of diametrically opposed cylindrical holes in the plate, said pins having a cylindrical surface conforming to and engageable with only a portion of the cylindrical surfaces in said plate, said gage member having a laterally disposed recess, an aligning member having a first element thereon engageable in a laterally disposed recess in said body component and a second element engageable in the recess in the gage member, and means for mounting said aligning member on said supporting means for movement to an operative position laterally adjacent said components and with the elements thereon in engagement with the recesses in said body component and said gage member to angularly align the body component and the mounting plate relative to each other.

3. A fixture for angularly aligning a plurality of apertured components of a magnetron including a body component and an apertured mounting plate component and for supporting said components while they are being brazed together comprising a base, an arbor on said base for supporting the components in coaxial alignment thereon about a substantially vertical axis and with the mounting plate supported on the body component for angular movement relative thereto, a gage member adapted to be supported on the mounting plate component and having a pair of integral depending pins adapted to fit into a pair of diametrically opposed poles in the plate, said pins being smaller than the holes in said plate and having surfaces conforming to and engageable with a portion of the plate around said holes to interlock the plate and the gage member against relative rotary or lateral movement and to provide clearance permitting expansion of the mounting plate during the brazing operation, said gage member having a laterally disposed recess, an aligning member having a first element thereon engageable in a laterally disposed recess in said body component and having a second element engageable in the recess in the gage member, and means for mounting said aligning member on said base for movement toward said arbor to an operative position adjacent said components and with the elements on said aligning member in engagement with the recesses in said body component and said gage member to angularly align the mounting plate and the body component relative to each other.

4. An aligning fixture for supporting an apertured mounting plate component on a recessed body component of a composite article during brazing and for angularly aligning the components comprising a base having means for supporting the body component with the mounting plate superposed thereon for relative oscillatable movement about a vertical axis, a cooling block adapted to be supported on the mounting plate and having a pair of integral depending aligning pins engageable in apertures in said plate, the pins being smaller than the apertures in the plate for engaging predetermined restricted portions thereof to interlock the block and the plate against relative turning movement, said cooling block having gaging surfaces, and an aligning arm mounted on said base for movement toward said axis into a predetermined operative position adjacent said components and having portions thereon engageable with the gaging surfaces on said cooling block and in a laterally disposed recess in said body component to angularly align the mounting plate and the body component relative to each other.

5. A fixture for angularly aligning a hollow body component and an apertured mounting plate component of an article and for supporting said components while they are being brazed comprising a base, an arbor, means for removably securing the arbor to said base in a substantially vertical position for supporting the components in coaxial alignment and for relative angular movement and with the mounting plate superposed on the body component, a cooling member supported on the mounting plate component and having a pair of depending integral pins fitting into a pair of diametrically opposed apertures in the mounting plate, said pins being smaller than the apertures in said plate and having surfaces conforming to and engageable with a portion of the plate to interlock the plate and the cooling member against relative rotary movement and to provide clearance permitting expansion of the plate during the brazing operation, said cooling member having a laterally disposed gaging recess, an aligning member having a first element thereon engageable in a laterally disposed recess in said body component and having a second element engageable in the gaging recess in the cooling member, and means for mounting said aligning member on said base for pivotal movement toward said arbor and the components thereon to an operative position adjacent the components and with the elements on the aligning member in engagement in said recesses in the body component and the cooling member to angularly align the mounting plate and the body component relative to each other.

References Cited in the file of this patent
UNITED STATES PATENTS

| | | |
|---|---|---|
| 1,465,330 | Ardner | Aug. 21, 1923 |
| 1,508,342 | Lee | Sept. 9, 1924 |
| 1,541,058 | Lee | June 9, 1925 |
| 1,750,522 | Judd | Mar. 11, 1930 |
| 2,012,443 | Coe | Aug. 27, 1935 |